(12) United States Patent
Hosoda et al.

(10) Patent No.: US 7,606,462 B2
(45) Date of Patent: Oct. 20, 2009

(54) VIDEO PROCESSING DEVICE AND METHOD FOR PRODUCING DIGEST VIDEO DATA

(75) Inventors: Tatsuya Hosoda, Nagano-ken (JP); Junichiro Shinozaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 712 days.

(21) Appl. No.: 11/082,007

(22) Filed: Mar. 15, 2005

(65) Prior Publication Data

US 2005/0232588 A1 Oct. 20, 2005

(30) Foreign Application Priority Data

Mar. 23, 2004 (JP) ............................. 2004-084443

(51) Int. Cl.
*H04N 5/76* (2006.01)
(52) U.S. Cl. ........................ 386/52; 715/723
(58) Field of Classification Search ................. 715/723, 715/725; 386/46, 52
See application file for complete search history.

(56) References Cited

U.S. PATENT DOCUMENTS

| | | | | |
|---|---|---|---|---|
| 6,535,639 | B1 * | 3/2003 | Uchihachi et al. | 382/225 |
| 6,549,643 | B1 * | 4/2003 | Toklu et al. | 382/107 |
| 7,035,435 | B2 * | 4/2006 | Li et al. | 382/107 |
| 2005/0108622 | A1 * | 5/2005 | Jun | 715/500.1 |
| 2006/0165379 | A1 * | 7/2006 | Agnihotri et al. | 386/95 |

FOREIGN PATENT DOCUMENTS

| JP | 2002-142189 | 5/2002 |
|---|---|---|
| JP | 2002-330393 | * 11/2002 |

OTHER PUBLICATIONS

Abstract of Japanese Patent Publication No. 2002-142189, Pub. Date: May 17, 2002, Patent Abstracts of Japan.

* cited by examiner

*Primary Examiner*—David E Harvey
(74) *Attorney, Agent, or Firm*—Martine Penilla & Gencarella, LLP

(57) ABSTRACT

The video processing device calculates evaluation levels of frame images in video data. Scene evaluation levels are then calculated from the frame evaluation levels in each scene. The playback times for the digest video of each scene are determined from the scene evaluation levels. Collections of frame image data with the playback time are extracted from each scene and are combined to produce digest video of the desired playback time.

1 Claim, 14 Drawing Sheets

Fig.3(a)  Zoom in
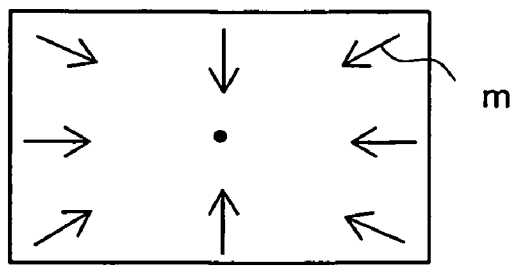
Fig.3(b)  Zoom out
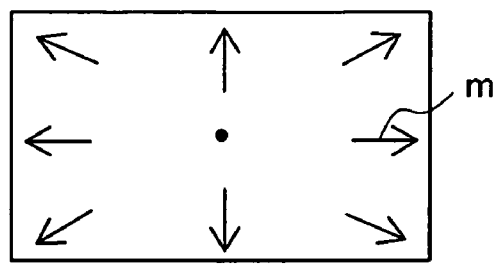
Fig.3(c)  Pan
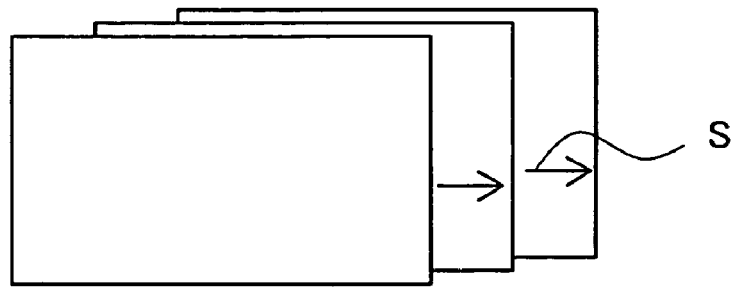
Fig.4
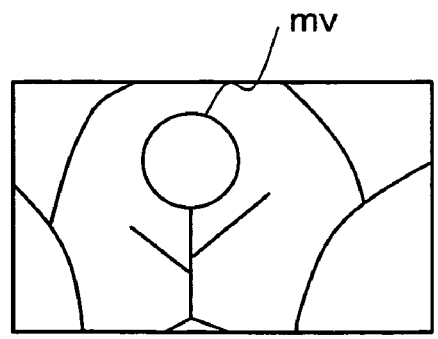

VIDEO PROCESSING DEVICE AND METHOD FOR PRODUCING DIGEST VIDEO DATA

CROSS-REFERENCE TO RELATED APPLICATIONS

The present application claims the priority based on Japanese Patent Application No. 2004-84443 filed on Mar. 23, 2004, the disclosure of which is hereby incorporated by reference in its entirety.

BACKGROUND OF THE INVENTION

1. Field of the Invention

The invention relates to a video processing device for producing digest video data in which the contents have been condensed based on video data.

2. Description of the Related Art

Recently, with the growing popularity of video cameras, it has become increasingly more common to take photographs using video cameras. At the same time, there has been greater demand for more promptly and easily getting the contents of video data that has been photographed over a long period of time. Techniques have thus been proposed producing digest video data, referred to as digest images, as condensed data of video data.

Digest video data is sometimes produced according to the desired level of digest video playback time (referred to below as desired playback time). In JP2002-142189A, for example, the video data is split into a plurality of scenes in certain playback time units, the number of scenes included in the digest video data is determined based on the certain playback time and the desired playback time, and that number of scenes are joined to produce digest video data corresponding to the desired playback time.

However, a problem in this prior art is that the number of scenes included in the digest video data is limited by the desired playback time.

SUMMARY OF THE INVENTION

An object of the present invention is to provide a video processing technology for extracting numerous scenes from among the scenes of the video data to produce digest video data.

According to an aspect of the present invention, there is provided a video processing device for producing digest video data of a desired playback time from original video data including a plurality of frame images that are continuous in a time series. The device comprises: a scene splitting module configured to split the original video data into a plurality of scenes each including a plurality of frame images; a frame evaluation level calculating module configured to calculate a frame evaluation level representing an importance of each frame image; a scene evaluation level calculating module configured to calculate a scene evaluation level representing an importance of each scene from the frame evaluation levels of the frame images included in the scene; a playback time computing module configured to determine a scene playback time of each scene in the digest video data, based on the desired playback time and the scene evaluation level; a frame extracting module configured to extract frame images to be used in the digest video data from each scene, based on the scene playback time; and a digest production module configured to produce the digest video data from the extracted frame images.

This device flexibly produces digest video data including numerous scenes according to the desired playback time because the scene playback time is set for each scene.

The scene evaluation level may be calculated from the frame evaluation levels of all the frame images contained in the scene, or the scene evaluation level may be calculated from the frame evaluation levels of selected frame images in the scene.

The scene playback time may be set higher as the scene evaluation level increases. Each scene playback time may be determined by distributing the desired playback times based on the proportion of scene evaluation levels in each scene. The necessary number of frames may be extracted according to the scene playback time.

Scenes can be split in a number of ways. For example, video data may be split into scenes based on discontinuous changes in a characteristic value of the frame image. The characteristic value such as the frequency, acoustic tone, and magnitude of audio data, and color histogram or brightness of the frame image data often changes discontinuously at locations where a scene changes in videos. Video data can thus be split into scenes based on such discontinuous changes in the value. In another method, the video data can be split into scenes based on the differences in individual pixel values in two frame images. Locations where the total absolute or squared difference of all pixels is over a certain value can be considered a location where a scene changes. The splitting module may be one that splits the video data at certain intervals regardless of content. The interval may be based on time or data level, for example.

The frame evaluation level may be calculated based on the zooming or panning operation of a video camera, for example. Zooming is when the zoom lens is used to enlarge or shrink the image of the photographed subject. Panning is when the direction of the camera is altered to photograph a wide range while the camera position is fixed.

The frame evaluation level may also be calculated using a motion vector determined by comparing two frames of image data including frame image data for which the evaluation level is being calculated. Zooming can be detected from the motion vector to specify frame images which the photographer is believed to have intentionally photographed. The frame evaluation level may be calculated by determining such frame images as those of high importance in the video data.

It is not necessary to use a motion vector to calculate the frame evaluation level. For example, photographic data such as zooming or the orientation of the camera can be recorded during photography, and the photographic data can be used to calculate the frame evaluation level. The frame evaluation level may also be calculated based on the extent of the flesh tones, background movement, size of moving objects, and position of moving objects in the frame image. The frame evaluation level may also be calculated based on audio data, color histogram or brightness of the frame image data, and number of objects in the frame image.

The video processing device may also comprise a total evaluation calculating module for calculating a total evaluation level as an evaluation level of all the video data from the frame evaluation levels in the video data. The scene playback time may be determined based on the total evaluation level, the scene evaluation level, and the desired playback time.

The total evaluation level can be used to more easily determine the scene playback time. For example, the scene playback times may be determined based on the desired playback time and the proportion between the scene evaluation level and the total evaluation level. Basically, the scene playback time can be determined by "desired playback time×scene evaluation level/total evaluation level." Other methods may also be employed, such as determining the scene playback time based on the scene evaluation level and total evaluation level.

The total evaluation level may be calculated from the frame evaluation levels of all the frame images in the video data, or from the frame evaluation levels of selected frame images in the video data. Furthermore, when there are scenes which are not used in the digest video data, the total may be the sum of scene evaluation levels except for the scene evaluation levels of those scenes.

The scene evaluation level may be the average of the frame evaluation levels of frame images contained in the scene.

This allows the scene evaluation level indicating the importance of the video data of each scene to be easily calculated. The average value may be the average of the frame evaluation levels of all frame images contained in a scene, and may be the average of the evaluation levels of selected fame images in a scene.

The average level can be used for the scene evaluation level to compare scenes without taking the scene length into consideration. Scene evaluation levels in which scene length has been taken into account may also be used. Because the scene evaluation level will be higher the greater the number of frame images when using the total of frame evaluation levels of all frame images contained in a scene as the scene evaluation level, for example, scene evaluation levels in which the scene length has been taken into account can be used. Scene length can be weighted in the average evaluation level to use scene evaluation levels in which scene length has been taken into account.

The aforementioned total evaluation level may be the total average, which is the average of the frame evaluation levels of the frame images in the video data. The total average may be obtained when the total of the frame evaluation levels of all frame images in the video data is divided by the number of frame images in the video data. Alternatively, the total average may be the average calculated without the frame evaluation levels of the frame images in the scenes which are not used in the condensed movie.

The scene evaluation level may be calculated from frame evaluation levels over the certain first threshold among all the frame evaluation levels of the frame images included in the scene.

This allows the scene playback time to be determined for each scene based on just the frame images of relatively high importance. In photographed scenes of an air show, for example, the sky will sometimes be photographed continuously for dozens of minutes, while the aircraft will be photographed for only a few minutes. The frame image data portraying the sky has relatively low importance as video data, and will also often have a low frame evaluation level. The scene evaluation level calculated from frame evaluation levels which include an abundance of low evaluation levels will also often be low. When the calculating module increases the scene playback time the higher the scene evaluation level, scenes with low scene evaluation levels can have little or no playback time. That is, it can happen that virtually no aircraft will be viewed in the digest video. The above structure can prevent the scene playback time of aircraft shows from being inappropriately shortened because the scene valuation levels are determined without frame evaluation levels of frame images which only include the sky.

The total average level may also be the average of frame evaluation levels over a certain level among the frame evaluation levels of the frame images in the video data.

The scene playback time may be calculated for each scene except for those scenes having a scene evaluation level under a certain level, for which the scene playback time is to be set zero.

In the present invention, the scene playback time of other relatively important scenes can be increased without using relatively unimportant scenes with a scene evaluation level below a certain level for the digest video data from the very beginning. On the other hand, at least one frame image data from each scene may be extracted without establishing such a function. Because this will allow at least part of every scene to be included in the digest video, the digest video can be viewed to readily grasp all the scenes. Furthermore, when the splitting module splits the video data into certain intervals instead of scene units, the user can determine whether or not video data at certain intervals is necessary by viewing digest video which has been produced by extracting at least one frame image from the split data. It is thus possible to produce digest video data which can be employed by the use for editing purposes.

The extracting module may also extract the frame images as frame groups which are a collection of at least a certain number of frame images that are continuous in a time series.

This will ensure that the frame groups are long enough to allow the viewer of the digest video to grasp the contents. Such frame groups are suitable for use as digest video data. Video portrayed by frame groups is referred to below as a shot.

The extracting module may also extract collections of frame images apart from each other in small time intervals, such as every other one. This will allow at least the contents of the digest video to be determined in what is being viewed.

The extracting module may extract a frame group comprising the most-valuable frame image with the greatest evaluation level among the frame images contained in the scene.

This allows frame groups which are believed to correspond to shots of particularly high importance in a scene to be easily extracted. Such frame groups are suitable for use in digest video data.

The extracting module may extract a frame group so that the number of frame images before the most-valuable frame image in the frame group is greater than the number of frame images after the most-valuable frame image.

When a plurality of data are shown, the fact that the initially shown data has the strongest effect is referred to as the primacy effect (anticlimax effect). Conversely, the fact that the last data shown has the strongest effects is referred to as the affinity effect (climax effect). The present invention can extract a frame group having a dramatic effect in which the climax effect has been taken into consideration by bringing particularly good images in a shot toward later in the shot.

Although considering the climax effect is suitable for digest video, the anticlimax effect may be taken into consideration to extract a frame group so that the number of frame images before the most-valuable frame image is lower than the number of frame image data after the most-valuable frame image.

The extracting module may extract frame images meeting certain evaluation level-related conditions for determining suitability as part of the digest video data.

The extracting module may suitably extract frame images to be used in digest video data from among the scenes. However, the invention allows suitable frame images to be extracted by means of digest video data.

The certain conditions may be that the frame evaluation level should be over a certain second threshold. The minimum frame evaluation level considered suitable for the digest video data can be set as the second threshold to allow only frame images suitable for the digest video data to be extracted. Different thresholds for various scenes may be used.

The device may also comprise a threshold adjusting module for adjusting the second threshold according to the scene playback time. When the number of frame images with an evaluation level over the second threshold (referred to below as the threshold frame number) is not the number of frame images considered necessary for the scene playback time (referred to below as necessary frame number), the threshold adjusting module can adjust the second threshold, and the threshold frame number can be modified. The necessary number of frame images can thus effectively be extracted.

The threshold adjusting module may decrease or increase the second threshold. When the threshold frame number is lower than the necessary frame number, the threshold can be lowered. When, on the other hand, the threshold frame number is greater than the necessary frame number, the second threshold may be increased. When the threshold frame number is greater than the necessary frame number, the extracting module may extract the corresponding necessary number of frame images from among the frame images with an evaluation level over the second threshold.

During suitable extraction, the time series continuity of the frame images may be taken into consideration. For example, at least a certain number of continuous frame images (referred to below as continuous frames) may be extracted. Video based on continuous frames is preferred because the contents are easier to distinguish than video based on discontinuous frame images. Continuous frame images can consists of at least a certain number of frame images to ensure a length allowing the viewer of the digest video to get a grasp of the contents.

When continuous frame images is extracted, two continuous frame image data in which the time interval between continuous frame data is below a certain level may be extracted in the form of one continuous frame datum by adding the two continuous frame data and all the frame image data between. Data may also be extracted in cases where the frame evaluation level of all the frame images between two continuous frame data is over the second threshold, as well as cases in which it is under the second threshold. When the time interval is short between the extracted continuous frame data and continuous frame data, the viewer of the digest video may feel the digest video is unnaturally choppy. The invention can prevent such instances.

During suitable extraction, a collection of frame image data in which the rate of change in the evaluation level relative to the time series frame image data is more than zero may be preferentially extracted. In general, frame images during or immediately after zooming are often more important as video than frame images after zooming. When evaluation levels are set based on zooming operations, the rate of change in the evaluation level is often greater than zero in collections of frame images during or immediately after zooming, while the rate of change in the evaluation level in collections of frame images after zooming is often negative. Before and after zooming, even when the evaluation level is the same, there will be frame images with different positive and negative rates of change. When both are compared, even if the evaluation level is the same, collections of frame images in which the rate of change in the evaluation level is effectively zero will often be more important as video compared to collections of frame images with a negative rate of change in the evaluation level. It is thus possible to extract collections of frame images which are more suitable as video data.

The certain condition may also be that the total of the frame evaluation levels of extracted frame images should be the greatest in the scene.

For example, the total evaluation level is the maximum when the necessary number of frame images is extracted sequentially, beginning with the frame image having high evaluation levels. Digest video data can be composed of the frame images with high evaluation levels in a scene by using collections of frame images with the greatest total evaluation level as the necessary video data. Incidentally, when the total evaluation level of the necessary number of frame images is the greatest, the evaluation level will be the greatest.

In addition to the structure of the video processing device, the invention can also be composed as a video processing method invention. The invention can also be realized in various embodiments such as computer programs for realizing the method and recording media on which such programs are recorded, The various additional elements noted above can also be applied to such embodiments.

When the invention is composed as a computer program or recording media, etc., on which such programs are recorded, they may be composed in the form of a program as a whole for controlling the operations of a video processing device, or may be composed of just parts carrying out the functions of the invention. Examples of recording media include floppy disks, CD-ROM, DVD-ROM, opticomagnetic disks, IC cards, ROM cartridges, punch cards, barcodes, internal storage devices (memory such as RAM or ROM) or external storage devices of computers, or various other types of computer-readable media.

These and other objects, features, aspects, and advantages of the present invention will become more apparent from the following detailed description of the preferred embodiments with the accompanying drawings.

BRIEF DESCRIPTION OF THE DRAWINGS

FIGS. 3(a) through 3(c) illustrate a method for detecting frame image data at the start and end of zooming, and frame image data at the start and end of panning.

FIG. 4 illustrates a moving object mv.

DESCRIPTION OF THE PREFERRED EMBODIMENT

Embodiments of the invention are described in the following order.
A. First Embodiment
  A1. Structure of Video Processing Device
  A2. Calculation of Evaluation Levels
  A3. Calculation of Scene Playback Time and Extraction of Frame Groups
  A4. Process flow
B. Second Embodiment
  B1. Extraction of Frame Groups
  B2. Process flow
C. Variants

A. First Embodiment

A1. Structure of Video Processing Device

Figure 1:
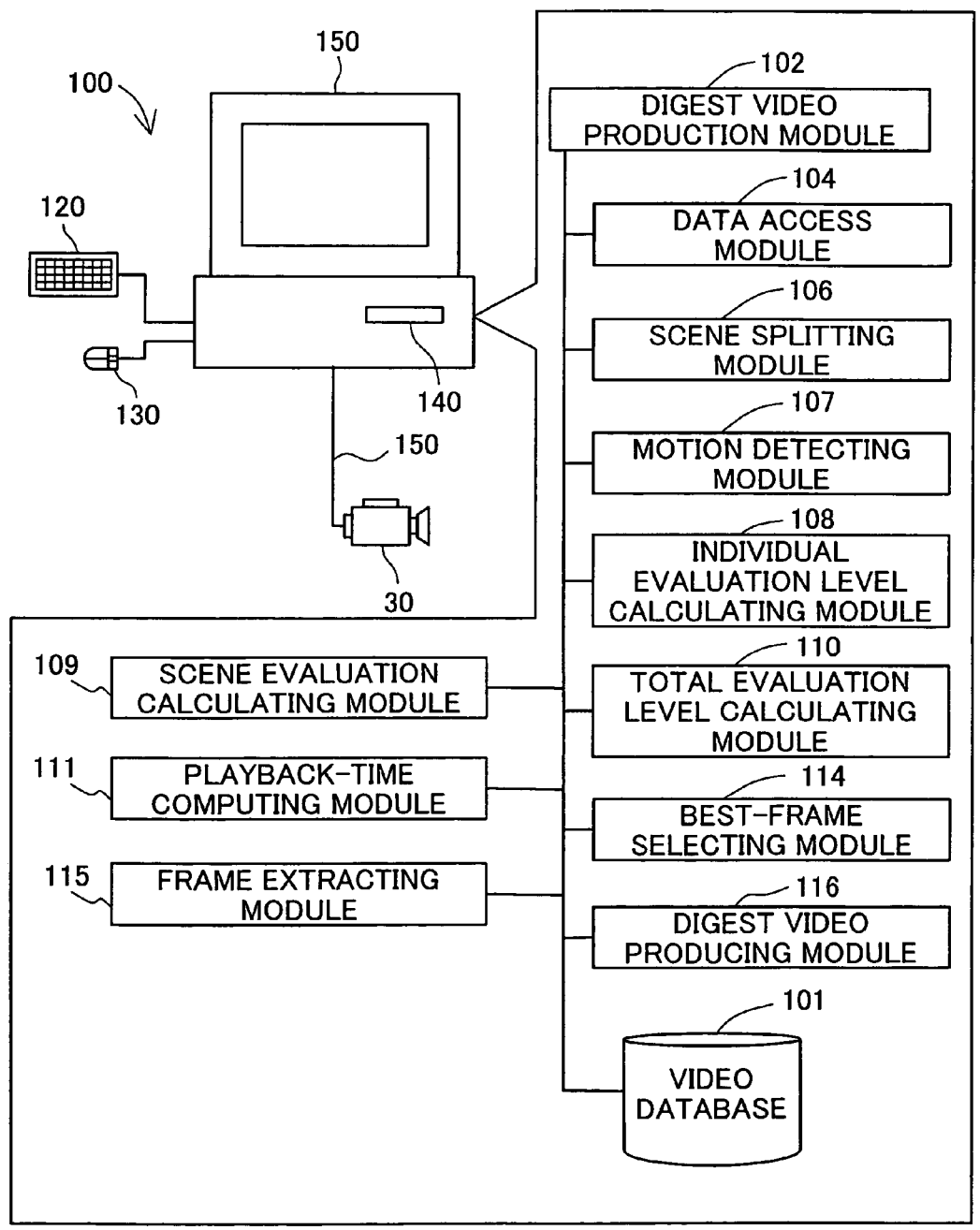
FIG. 1 illustrates the general structure of an embodiment of a video processing device.

FIG. 1 illustrates the general structure of an embodiment of a video processing device. The video processing device 100 is shown at the upper left, and function blocks of the video processing device 100 are shown at the lower right and left. The video processing device 100 is a device for producing digest video data having a playback time specified by a user (referred to below as desired playback time) from video data composed of a plurality of frame image data. In this embodiment, images represented by frame image data are referred to as frame images. The frame images may be still images which can be displayed by a non-interlaced format.

The video processing device 100 is a general purpose personal computer comprising a keyboard 120 and mouse 130 as devices for inputting data to the video processing device 100, and a display 150 as a device for outputting image. A digital video camera 30 and CD-R/RW drive 140 are provided as devices for inputting data to the video processing device 100. Drive devices which can read out data from various data recording media such as DVDs in addition to CD-R/RWs can be provided as devices for inputting video data.

The video processing device 100 makes use of application programs that operate under the control of a certain operating system to execute the functions of the function blocks illustrated in FIG. 1, comprising a digest video production control module 102, data accessing module 104, scene splitting module 106, motion detector module 107, individual evaluation level calculating module 108, scene evaluation level calculating module 109, total evaluation level calculating module 110, playback-time computing module 111, best-frame selecting module 114, frame extracting module 115, and digest video producing module 116. These functions may also be provided in the form of hardware.

The various functions are described below. The data accessing module 104 reads video data from a CD-RW in the CD-R/RW drive 140, digital video camera 30, hard disc (not shown), or the like t construct a video database 101 on RAM. The data accessing module 104 acquires the desired playback time of the digest video input by the user using the keyboard 120 or mouse 130, and stores it in memory.

The scene splitting module 106 detects breaks in video scenes and splits the video data into scenes. The motion detection module 107 determines motion vectors by comparison between frame images, and detects moving object blocks based on the motion vectors.

The individual evaluation level calculating module 108 calculates various evaluation levels described below for frame image data based on the motion vectors, or moving object blocks. The scene evaluation level calculating module 109 calculates the average evaluation level of the frame images in a scene (referred to below as scene evaluation level). The total evaluation level calculating module 110 calculates the average evaluation level of the frame images in the video data (referred to below as total evaluation level). The playback-time computing module 111 calculates a playback time of digest video in each scene (referred to below as scene playback time) from the scene evaluation level, total evaluation level, and desired playback time.

The best-frame selecting module 114 identifies the frame image with the greatest frame evaluation level in the scene (referred to below as "most-valuable frame image" or "best frame image"). The frame extracting module 115 extracts collections of frame image data continuous in a time series, including the best frame image data. The collection of continuous frame image data will be referred to as "frame group." The digest video module 116 combines the extracted frame groups to produce digest video data, and outputs the data to the CD-RW in the CD-R/RW drive, digital video camera 30, or hard disk. The digest video production control module 102 comprehensively controls the operations of the aforementioned modules in producing the digest video.

A display module for displaying the digest video on the display 150 using the digest video data may also be provided.

A2. Calculation of Evaluation Levels

The individual evaluation level calculating module 108 evaluates the frame image data in terms of the parameters of zooming, panning, still, position of moving objects, size of moving objects, and extent of flesh tone.

Figure 2A:
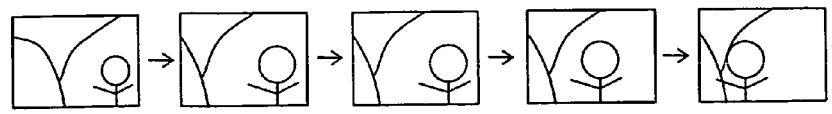
FIGS. 2(a) through 2(g) illustrate frame evaluation levels of frame image data.

FIGS. 2(a) through 2(g) illustrate various evaluation levels of frame image data. FIG. 2(a) illustrates an example of five selected frame images from video. The frame images are in a time series, starting from the left. The frame images in FIG. 2(a) are not continuous. There are several frame images in the video between the nth (n=1 to 4) frame image from the left and n+1 frame image, although they are not illustrated. FIGS. 2(b) through 2(g) are graphs of temporal changes in the evaluation levels of frame image data for each parameter. The graph times correspond to time since the start of playback during video playback. In the graphs, the evaluation levels of the frame image data shown at the elapsed times during video playback are joined by a line. In the graphs, the evaluation levels for the frame image data in FIG. 2(a) are shown near the location under the center of the frame image.

Figure 2B:
Figure 2C:
Figure 2D:
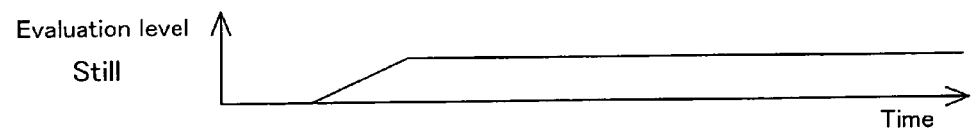
Figure 2E:
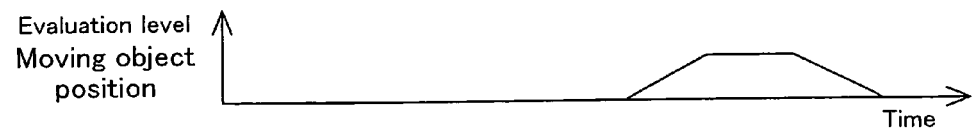
Figure 2F:
Figure 2G:
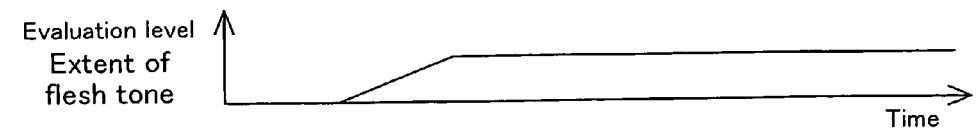

FIG. 2(b) is a graph of the evaluation level "zoom." "Zoom" is the evaluation level related to zooming. Zooming is a camera operation that enlarges or shrinks the photographed subject. The individual evaluation level calculating module 108 calculates the evaluation level "zoom" using two functions called the zooming function and the end of zooming function. The zooming function is a linear function which tends to be positive, outputting greater "zoom" the greater the time since the start of zooming. The end of zooming function is a linear function which tends to be negative, outputting less "zoom" the greater the time since the start of zooming.

The evaluation level computing module 108 employs the zooming function until 30 frames after the end of zooming from the start of zooming, and employs the end of zooming function from 30 frames after the end of zooming. Only the gradient is determined in the end of zooming function. The intercept of the end of zooming function is determined by the evaluation level module 108 in such a way that the first "zoom" value determined by the end of zooming function is consistent with the final "zoom" value determined by the zooming function. The evaluation level module 108 uses the end of zooming function until the level is less than 0. When the "zoom" is less than 0, it is adjusted to 0. The individual evaluation level calculating module 108 assigns a value of 0 to the "zoom" of any frame image data which does not apply to the time until "zoom" less than 0 is output after the start of zooming.

Frame images during or immediately after zooming are considered frame images which the photographer deliberately photographed, and the zooming function is set as described above. Detecting methods for when zooming has started and after zooming has ended are described below.

Zooming to enlarge the image of the photographed subject is referred to as zooming in, while shrinking the image of the photographed subject is referred to as zooming out. The zooming and end of zooming functions are used for both zooming in and zooming out. In the frame images in FIG. 2(*a*), zooming in begins from the first frame image from the left and ends at the second frame image from the left. The evaluation level "zoom" of FIG. 2(*b*) thus changes as illustrated in the graph.

FIG. 2(*c*) is a graph of the evaluation level "pan." "Panning" is when the direction of the camera is altered to photograph a wide range while the camera position is fixed. The individual evaluation level calculating module 108 calculates the evaluation level "pan" by means of two panning functions. The two panning functions are structurally similar to the two previous zooming functions, and are used upon the detection of frame image data at the start and end of panning. The conditions for the times during which the two panning functions are used are the same as for the two zooming functions. The individual evaluation level calculating module 108 calculates 0 for "panning" other than times in which the panning functions are used. Frame images during or immediately after panning are considered frame images deliberately photographed by the photographer, and the panning functions are established as noted above. Detecting methods for when panning has started and after panning has ended are described below. Since no panning operations have been performed in the frame images in FIG. 2(*a*), the evaluation levels in FIG. 2(*c*) remain 0.

FIG. 2(*d*) is a graph of the evaluation level "still." "Still" is an evaluation level related to background movement. The individual evaluation level calculating module 108 calculates the evaluation level "still" by means of a function referred to as the still function. The still function is a function for outputting "still" when the extent of background motion (referred to below simply as the "extent of motion") is input. The still function outputs greater values the closer the speed is to 0. A value of 0 is output when the speed is over a certain level. Frame images of shots in which the background is still are considered frame images deliberately photographed by the photographer, and the still function is set as described above. A method for calculating background speed is described below. In the frame images in FIG. 2(*a*), the background motion gradually decreases until the second frame image from the left, and the background is still starting from the second frame image. The evaluation level in FIG. 2(*d*) thus changes as shown in the graph.

FIG. 2(*e*) is a graph of the evaluation level "moving object position." The "moving object position" is an evaluation level related to the position of moving objects (photographed subjects). As used below, the moving object is the largest moving object in the frame image. The individual evaluation level calculating module 108 calculates the evaluation level "moving object position" by means of a function referred to as the moving object position function. The moving object position function is a function outputting the evaluation level "moving object position" when the position of the moving object in the frame image is input. The moving object position function outputs greater values the closer the input value for the moving object position is to the center of the frame image. A value of 0 is calculated when a value outside a predetermined range including the center of the frame image is input for the moving object position. Frame images in shots where the moving object is in the center are considered frame images deliberately photographed by the photographer, and the moving object position function is set as described above. A method for calculating the position of moving objects is described below. In the frame images in FIG. 2(*a*), starting at the third frame image from the left, the moving object (person) gradually moves to the center of the frame image, and in the fourth frame image, the moving object (person) is located virtually in the center of the frame image. The moving object (person) then, from the fourth frame image, gradually moves from the center toward the left. The evaluation levels in FIG. 2(*e*) thus change as shown in the graph.

FIG. 2(*f*) is a graph of the evaluation value "moving object size." The "moving object size" is an evaluation level related to the size of the moving object in the frame image. The individual evaluation level calculating module 108 calculates the evaluation level "moving object size" by means of a moving object size function. The moving object size function is a function outputting the evaluation level "moving object size" when the size of the moving object in the frame image is input. The moving object size function outputs greater values the greater the input value is. The value 0 is calculated when a value under a certain level is input. Frame images in which the photographed moving object is large are considered frame images deliberately photographed by the photographer, and the moving object size function is set as noted above. A method for calculating the size of the moving object is described below. In the frame images in FIG. 2(*a*), the moving object gradually becomes bigger starting in the first frame image from the left. From the second frame image, the moving object stays a constant size. The evaluation levels in FIG. 2(*f*) thus change as shown in the graph.

FIG. 2(*g*) is a graph of the evaluation level "extent of flesh tone." The "extent of flesh tone" is an evaluation level related to the extent of the flesh tones in the frame image. The individual evaluation level calculating module 108 calculates the evaluation level "extent of flesh tone" by means of a function referred to as the flesh tone extent function. The flesh tone extent function is a function outputting the evaluation level "extent of flesh tone" when the extent of the flesh tones in the frame image are input. The flesh tone extent function outputs greater images the greater the values that are input. The value 0 is calculated when a value under a certain level is input. Frame images in which a greater extent of flesh tone is photographed are considered frame images deliberately photographed by the photographer, and the level is set as described above. A method for calculating the extent of the flesh tones is described below. In the frame images in FIG. 2(*a*), the flesh tones gradually increase in the first frame image from the left, and the color tones stay at a constant level from the second frame image. The evaluation levels in FIG. 2(*g*) thus change as shown in the graph.

The functions used to calculate the evaluation levels above can be set in a variety of ways. For example, the still function for calculating the evaluation level "still" may output different levels depending on the number of frame image data after the background speed reaches 0. Similarly, different values for the position of the moving object may be output depending on the number of frame image data after the position of the moving object is in the center. In addition to the above evaluation levels, the individual evaluation calculating module 108 may output evaluation levels related to translation and moving speed of the moving object. Translation is when the moving object is in the center of the frame image and the background is moving, such as a marathon relay. The moving speed of the moving object is the relative speed of the moving object relative to the background. The value 0 is calculated for the moving speed of the moving object when the moving speed of the moving object is over a certain level.

Methods for detecting the start and end of zooming, and the start and end of panning, are described below. The start and end of zooming, as well as the start and end of panning, are detected based on motion vectors. Motion vectors are vectors that indicate how much the pictures of each block, in which frame images are divided into a plurality, move between one frame image and another. The greater the movement of the pictures in the blocks, that is, the greater the motion vector of the blocks, the faster the moving objects portrayed by the pictures in the blocks are moving. A method for calculating motion vectors is described below. Motion vectors are described below as having already been calculated.

FIGS. 3(*a*) and 3(*b*) illustrate a method for detecting frame image data at the start and end of zooming, and FIG. 3(*c*) illustrates frame image data at the start and end of panning. In the video data, when the motion vectors m for each block, as illustrated in FIG. 3(*a*), begin to be oriented toward the center from outside the frame image, the individual evaluation level calculating module 108 determines that zoom in has begun, and the frame image data is detected as being frame image data in which zooming has begun. After zooming has started, when the motion vectors m for each block are not oriented from the outside the frame image toward the center as shown in FIG. 3(*a*), the frame image data is detected as being frame image data in which zooming has ended.

When the motion vectors m of each block begin to be oriented from the center of the frame image to the outside as in FIG. 3(*b*), the individual evaluation level calculating module 108 determines that zoom out has started, and the frame image data is detected as being frame image data in which zooming has begun. After zooming has started, when the motion vectors m for each block are not oriented from the center of the frame image toward the outside as shown in FIG. 3(*b*), the frame image data is detected as being frame image data in which zooming has ended.

The video data sometimes includes zoom button operating data as metadata indicating whether or not the video camera zoom button has been pressed. Frame image data in which zooming has begun or ended may thus also be detected on the basis of such zoom button operating data.

Frame images in which panning has begun or ended are detected based on the shift S of the frame image as a whole. The shift S is a vector indicating how much the frame image as a whole moves between one frame image and another. The greater the rate at which the video camera direction changes, the greater the magnitude of the shift S. When the direction of the shift S is the same in a certain number of frame images which are continuous in a time series as illustrated in FIG. 3(*c*), panning is determined to have begun. The first frame image data among the frame image data with shift S in the same direction is detected as being frame image data in which panning has begun. The last frame image data among the frame image data with shift S in the same direction is detected as being frame image data in which panning has ended.

Methods for calculating the background speed in frame images, the position of the moving object, and the size of the moving object are described below. These values are calculated based on moving object blocks that are collections of blocks in which the size of the motion vector is greater than a certain value. The picture portrayed by the moving object blocks is assumed to be of a moving object. When there are more than one moving object in a frame image, blocks in which the size of the motion vector is greater than a certain value are clustered to determine a plurality of moving object blocks representing a moving object. FIG. 4 illustrates a moving object mv.

The individual evaluation level calculating module 108 calculates the background speed by means of the size of the motion vectors of blocks other than the moving object blocks (referred to below as background blocks). The total size of the motion vectors of the background blocks may be used as the background speed, and the average size of the motion vectors of the background blocks may be used as the background speed. Here, the average value is used as the background speed.

The individual evaluation level calculating module 108 calculates the center of gravity of the moving object block(s) as the position of the moving object. The individual evaluation level calculating module 108 also calculates the size of the moving object block(s) as the size of the moving object. When there are more than one moving object blocks, the size of the moving object may be the size of the total moving object blocks.

A method for detecting the extent of the flesh tones is described below. The flesh tone area can be determined as the aggregate of pixels having RGB values meeting G>B and 0.1<H<0.9 where H is given in the following formulas.

$$H(\text{hue}) = 1.732(G-B)/(2R-G-B) \quad (1)$$

$$S(\text{saturation}) = \{(B-R)^2 + (R-G)^2 + (G-B)^2\}/3 \quad (2)$$

$$V(\text{brightness}) = R+G+B \quad (3)$$

The individual evaluation level calculating module 108 calculates the number of pixels of flesh tones in the frame image as the extent of the flesh tones. The extent of the flesh tones may also be the number of pixels of flesh tones in the moving object block.

A method for extracting frame groups based on evaluation levels determined in the manner above is described next. The individual evaluation level calculating module 108 combines the evaluation levels of the parameters determined above for each frame image data.

A3. Calculation of Scene Playback Time and Extraction of Frame Groups

Figure 5:
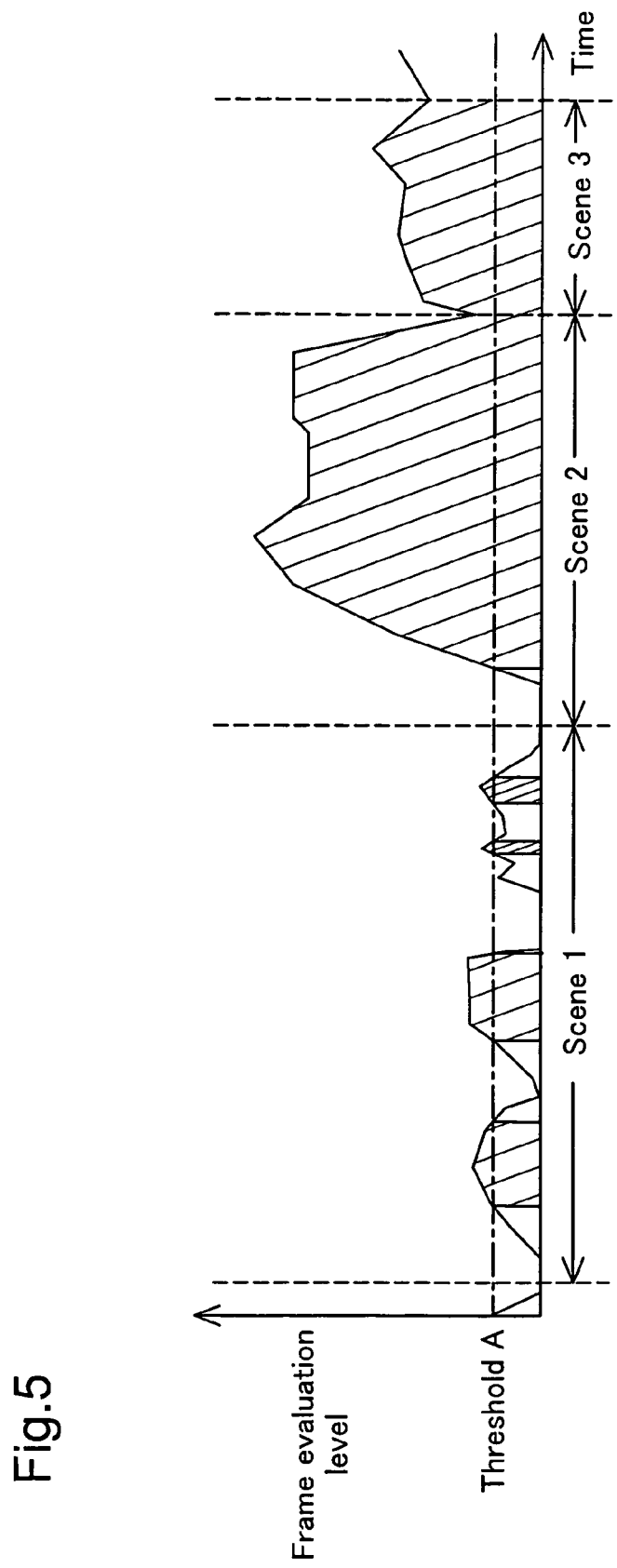
FIG. 5 illustrates the total evaluation levels determined by totaling the evaluation levels for each parameter.

FIG. 5 illustrates temporal change of a frame evaluation level which is determined from the total of the individual evaluation levels described with reference to FIGS. 2(*b*) through 2(*g*). In the same manner as in FIGS. 2(*a*) through 2(*g*), the time in the graph corresponds to the time since the start of playback when the video is played back. In the graph, the frame evaluation levels of the frame image data shown over time when the video is played back are joined by lines. The video data is split into scenes by the scene splitting module 106 according to the frame evaluation levels. The horizontal axis in FIG. 5 shows the scene names given each scene. The scene names are sequential, beginning with the first scene of the video data, with a sequence number at the end: Scene 1, Scene 2, etc. The time span shown in FIGS. 2(*b*) through 2(*g*) corresponds to that of "scene 2" in FIG. 5.

The scene evaluation level calculating module 109 calculates a scene evaluation level of each scene by averaging the frame evaluation levels exceeding a threshold A in the scene. In FIG. 5, the shaded portions represent frame image data whose frame evaluation levels are used to calculate the scene evaluation level. The scene evaluation levels for Scene 1, Scene 2, and Scene 3 are determined by averaging the frame evaluation levels for the shaded sections in FIG. 5. The threshold A can be any level over 0, serving to do away with unnecessary frame image data contained in the scene in order to properly evaluate the importance of each scene.

Figure 6:
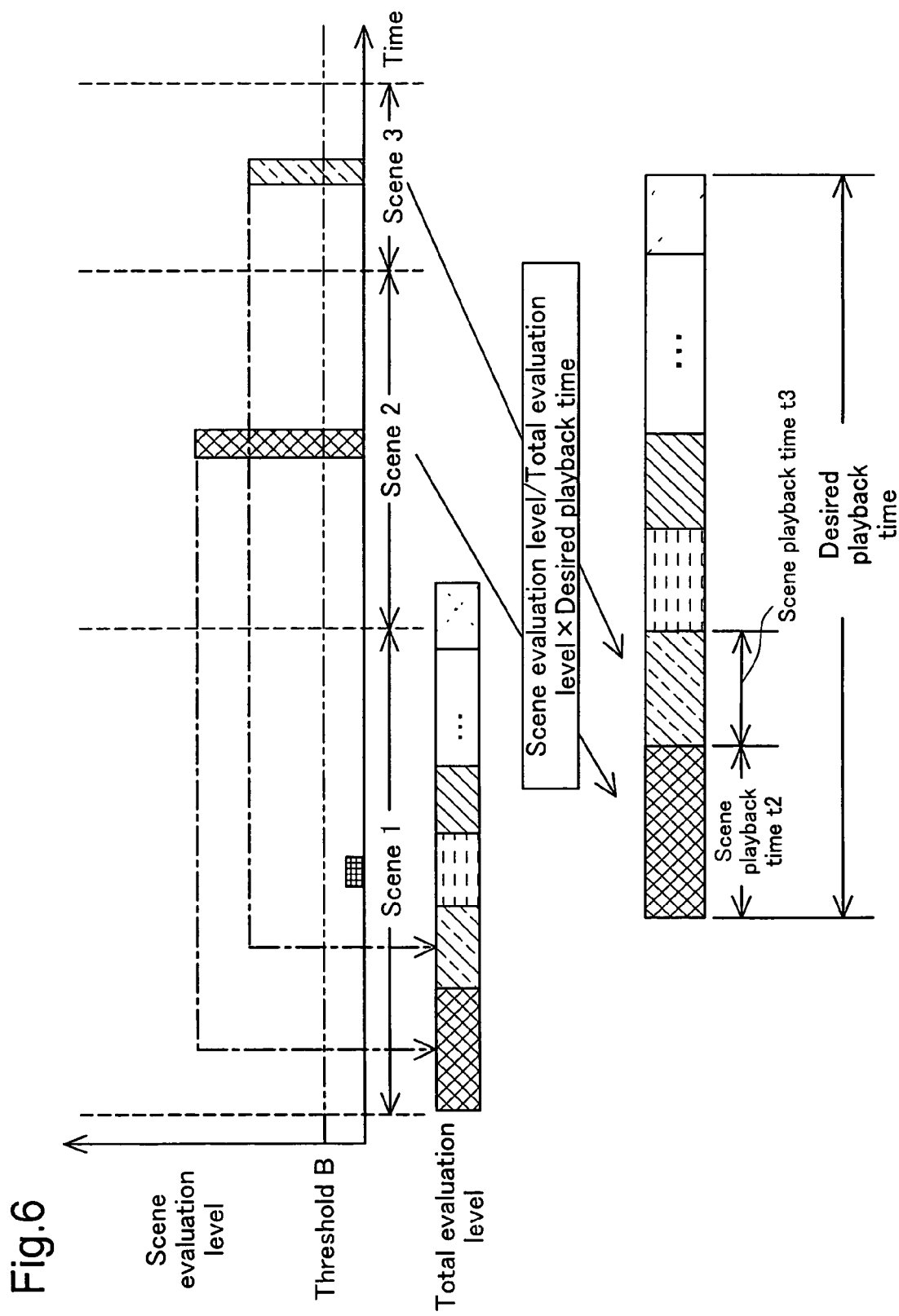
FIG. 6 illustrates scene evaluation levels.

FIG. 6 illustrates scene evaluation levels. The upper part of FIG. 6 shows bar graphs of scene evaluation levels determined for Scene 1, Scene 2, and Scene 3. In this embodiment, the playback-time computing module 111 assigns a scene playback time of 0 for scenes with a scene evaluation level lower than threshold B. In FIG. 6, the scene playback time for Scene 1 is 0. The threshold B can be any value over 0, and is a reference value for determining whether or not each scene will be used in the digest video data.

The total evaluation level calculating module 110 calculates a total evaluation level by summing up the scene evaluation levels exceeding the threshold B. In the example in FIG. 6, the total evaluation level=(scene evaluation level of scene 2)+(scene evaluation level of scene 3)+ . . . . The total evaluation level determined by the total evaluation level calculating module 110 is shown in about the middle of FIG. 6.

The playback-time computing module 111 determines a scene playback time for each scene as follows:

(Scene playback time)=(Scene evaluation level)/(Total evaluation level of all scenes)×(Desired total playback time)

Because the total evaluation level and desired total playback time are constant, the scene playback time is proportional to the scene evaluation level, as shown by the equation. The scene playback times for all scenes are then combined to come up with the desired total playback time. The bottom part of FIG. 6 shows the scene playback times for each scene relative to the desired total playback time. Since the scene playback time for Scene 1 is 0, it is not shown in the figure. The scene playback time t2 and scene playback-time t3 are shown in the figure.

Figure 7:
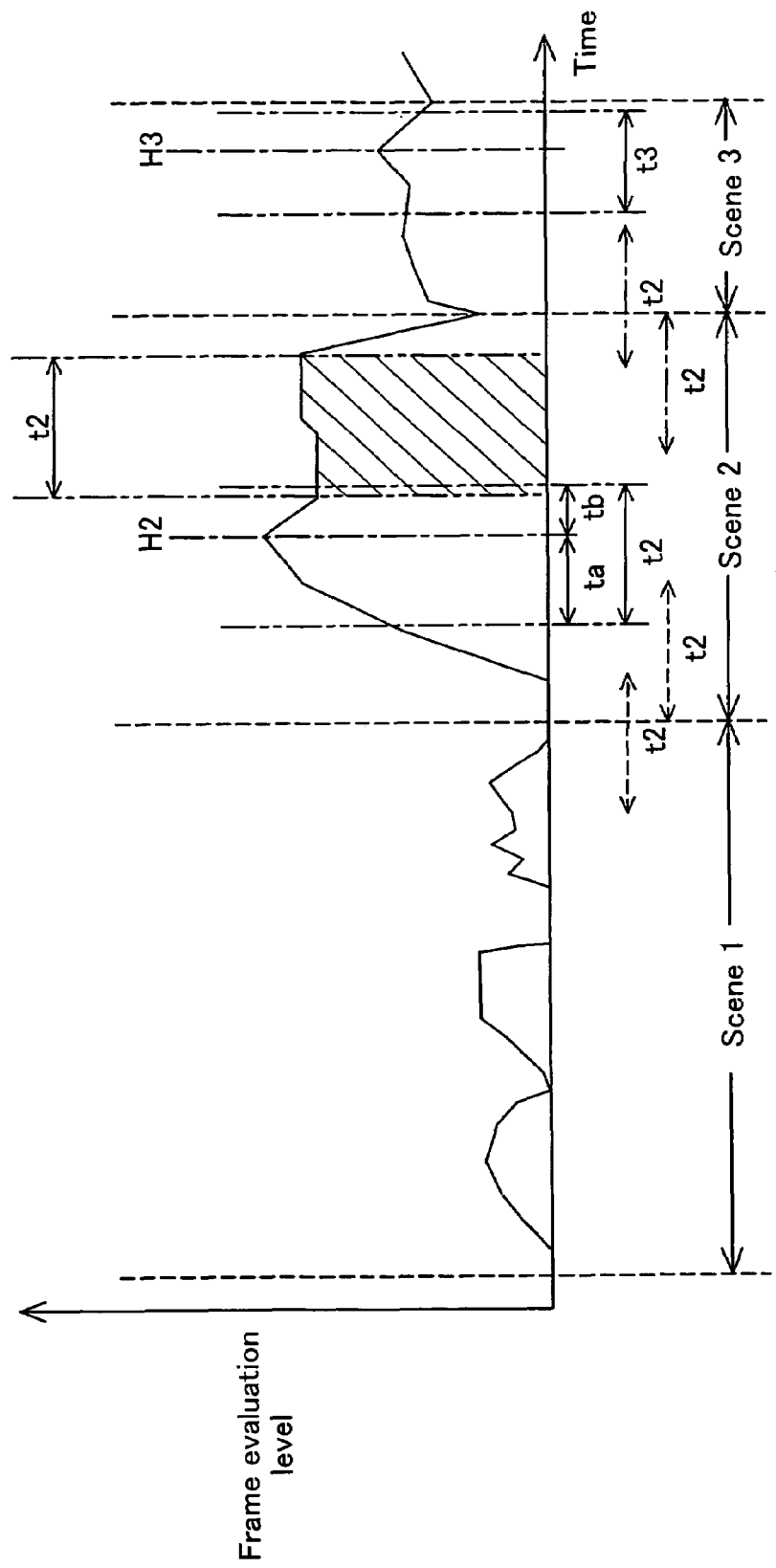
FIG. 7 illustrates the extraction of frame groups.

FIG. 7 illustrates the extraction of frame groups. In FIG. 7, the horizontal axis represents time, and the vertical axis represents the frame evaluation levels in the same manner as in FIG. 5. The number of frame images corresponding to the scene playback time determined by the playback-time computing module 111 is extracted in the form of a frame group by the frame extracting module 115. The frame group is extracted to include the best frame image or most-valuable frame image which has the greatest frame evaluation level in the scene. The frame extracting module 115 extracts a frame group in which the proportion of the frame image data before and after the best frame image is ta:tb (ta>tb). Specifically, this is as follows.

FIG. 7 shows the best frame image H2 for Scene 2 and the best frame image H3 for Scene 3, which have been specified by the best-frame selecting module 114. In the example of Scene 2, the frame extracting module 115 extracts a number of frame image data determined by t2×(ta/(ta+tb)) before the best frame image H2, and a number of frame image data determined by t2×(tb/(ta+tb)) after the best frame image H2.

During this extraction, when the first frame image data of the frame group is before the initial frame image data of the scene, the frame group is extracted using the initial frame image data of the scene as the first frame image data of the frame group such that the frame group includes frame images for the scene playback time t2 from this initial frame image. The time range of the scene playback time t2 of this example is indicated by the dotted line in FIG. 7. Conversely, when the last frame image data of the frame group is after the end frame image data of the scene, the frame group is extracted using the end frame image data of the scene as the last frame image data of the frame group such that the frame group includes frame images for the scene playback time t2 before this end frame image. The time range of the scene playback time t2 of this example is indicated by the dot-dash line in FIG. 7. In these cases as well, the number of frame image data corresponding to the scene playback time is extracted as the frame group.

FIG. 7 also shows other examples of extracted frame groups. The collection of frame image data indicated by the shaded part in FIG. 7 is another example of frame group. In this other example, the frame extracting module 115 selects the frame group such that the selected frame group has the greatest total evaluation level for the number of continuous frame image data corresponding to the scene playback time t2.

A4. Process Flow

Figure 8:
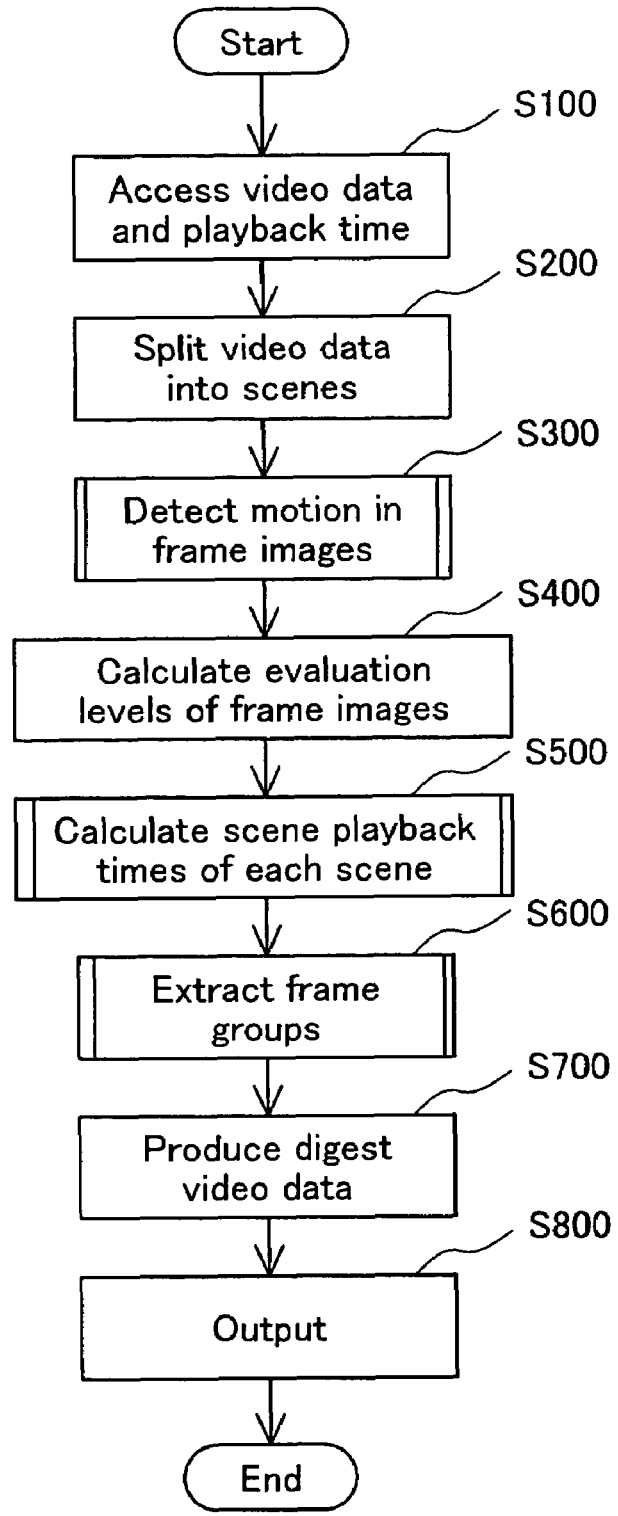
FIG. 8 illustrates the process for producing digest video data by the video processing device 100.

The process flow of the video processing device 100 is described below. FIG. 8 illustrates the process for producing digest video data by the video processing device 100. First, as a result of user input, the video processing device 100 acquires video data and the desired playback time of the digest video (Step S100). the acquired video data is then split into scenes (Step S200). Scenes are split by the known technique of comparing frame image data using a characteristic value of video data, such as color or brightness histogram, or audio data.

Figure 9:
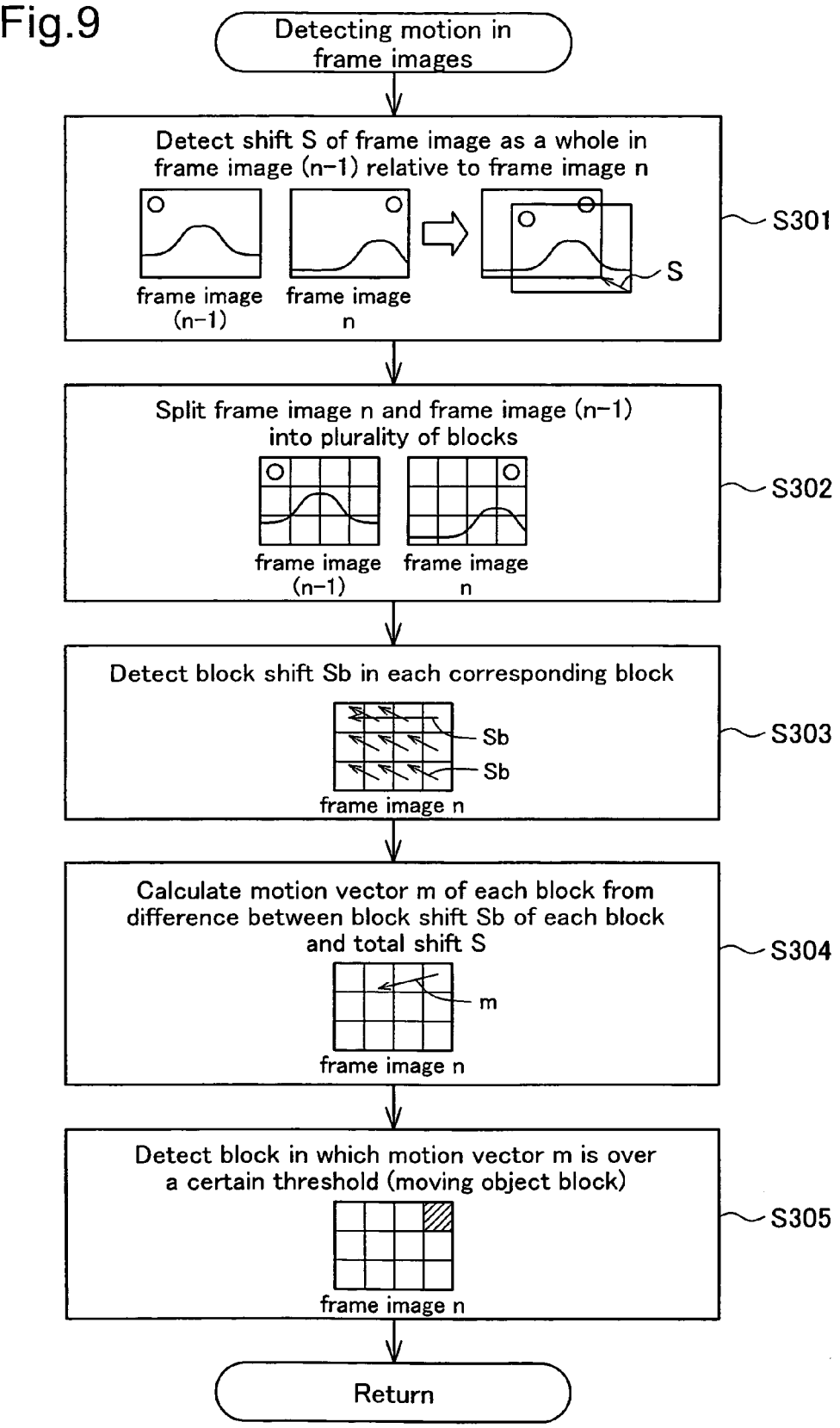
FIG. 9 is a flow chart of the process for detecting motion in the frame images.

The motion of the frame images is then detected (Step S300). FIG. 9 is a flow chart of the process for detecting motion in the frame images. In this process, the video processing device 100 first selects a reference frame image n for motion detection from among the plurality of frame images in the video, and detects the shift S of the frame images as a whole between the reference frame image n and the immediately preceding frame image (n−1) (Step S301). The shift S can be detected, for example, by using a known technique such as a gradient method or pattern matching. The shift S detected here corresponds to the shift S described above for detecting panning.

In the example in the figure, the moving object is a ball photographed in frame image (n−1) and reference frame image n against a mountain as the background. When the frame image (n−1) and the reference frame image n are compared, the mountain moves to the lower right of the frame image, and the ball moves toward the right in the frame image. It can be seen that the extent to which the ball moves is relatively greater than the extent to which the mounting moves, and that the area of the mountain in the frame image is greater than the area of the ball. With the application of a gradient method or pattern matching to such frame images, the shift of the mountain which has a greater proportion of area in the frame image overall will be detected preferentially over the shift of the ball which has a smaller area in the frame image overall. In other words, the shift of the frame image as a whole will correspond almost entirely to the shift of the mountain.

Although translation shift in the vertical and lateral directions and rotational shift in the rotating direction can also occur between the two frames, for the sake of simplicity, the description will be given as if no rotational shift had occurred.

After the shift S of the frame images as a whole has been detected, the video processing device 100 splits the reference frame image n and immediately preceding frame image (n−1) into a plurality of blocks (Step S302). The figure shows an example in which the frame images are divided in four laterally and in three vertically.

After the frame images have been split, the video processing device 100 detects the block shift Sb of the each block in the frame image (n−1) corresponding to the blocks of the reference frame image n (Step S303), and obtains the difference between the block shift Sb of those blocks and the total shift S to calculate the motion vector m for each block (Step S304). The motion vectors m calculated here correspond to the motion vectors m for detecting zoom in and zoom out described above. In the illustrated example, the block shift Sb of blocks other than the upper right block in which the ball has been photographed is cancelled because it is virtually equivalent to the shift S of the frame images overall detected in Step S301, and the motion vector m is zero, allowing only the motion vector m of the upper right block to be detected.

The video processing device 100 then determines whether or not the motion vector m is greater than a certain threshold, and the block in which the motion vector m is greater than the certain threshold is detected as the moving object (Step S305). The block in which the moving object is detected correspond to the moving object block for detecting "still", the position of the moving object, or the size of the moving object as described above. The threshold is established to eliminate minor shift (such as minimal rotating shift) between blocks. The threshold can be 30 pixels, for example. In the illustrated example, it is specified as that in which the upper right block in the reference frame image n is the moving object block.

The process in Steps S301 through S305 are carried out on all frame image data other than the first frame image data in the video data.

The description will now proceed with reference to FIG. 8. The video processing device 100 then calculates the individual evaluation levels of the frame image data based on the moving object block, motion vector m, and shift S detected in Step S300 (Step S400). The calculating method is as noted in Section A2 earlier. The individual evaluation level calculating module 108 calculates the evaluation levels for the parameters of zooming, panning, still, moving object position, size of the moving object, and extent of flesh tone. These are combined to determine the frame evaluation levels. The scene playback time of each scene is then calculated based on the frame evaluation levels that have been determined (Step S500)

Figure 10:
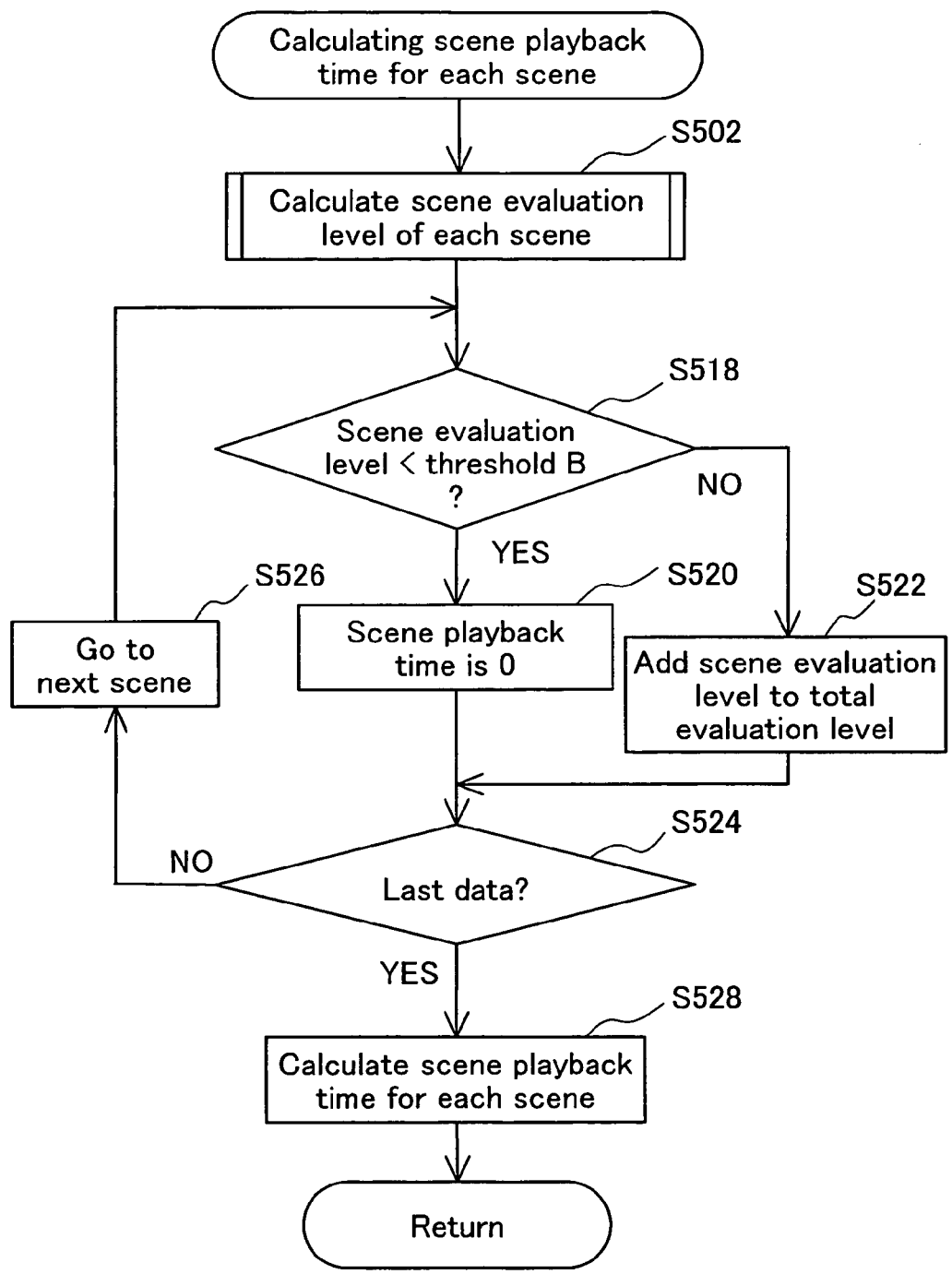
FIG. 10 is a flow chart of a process for calculating the scene playback time of each scene.

FIG. 10 is a flow chart of a process for calculating the scene playback time of each scene. First the scene evaluation level of each scene is calculated (Step S502).

Figure 11:
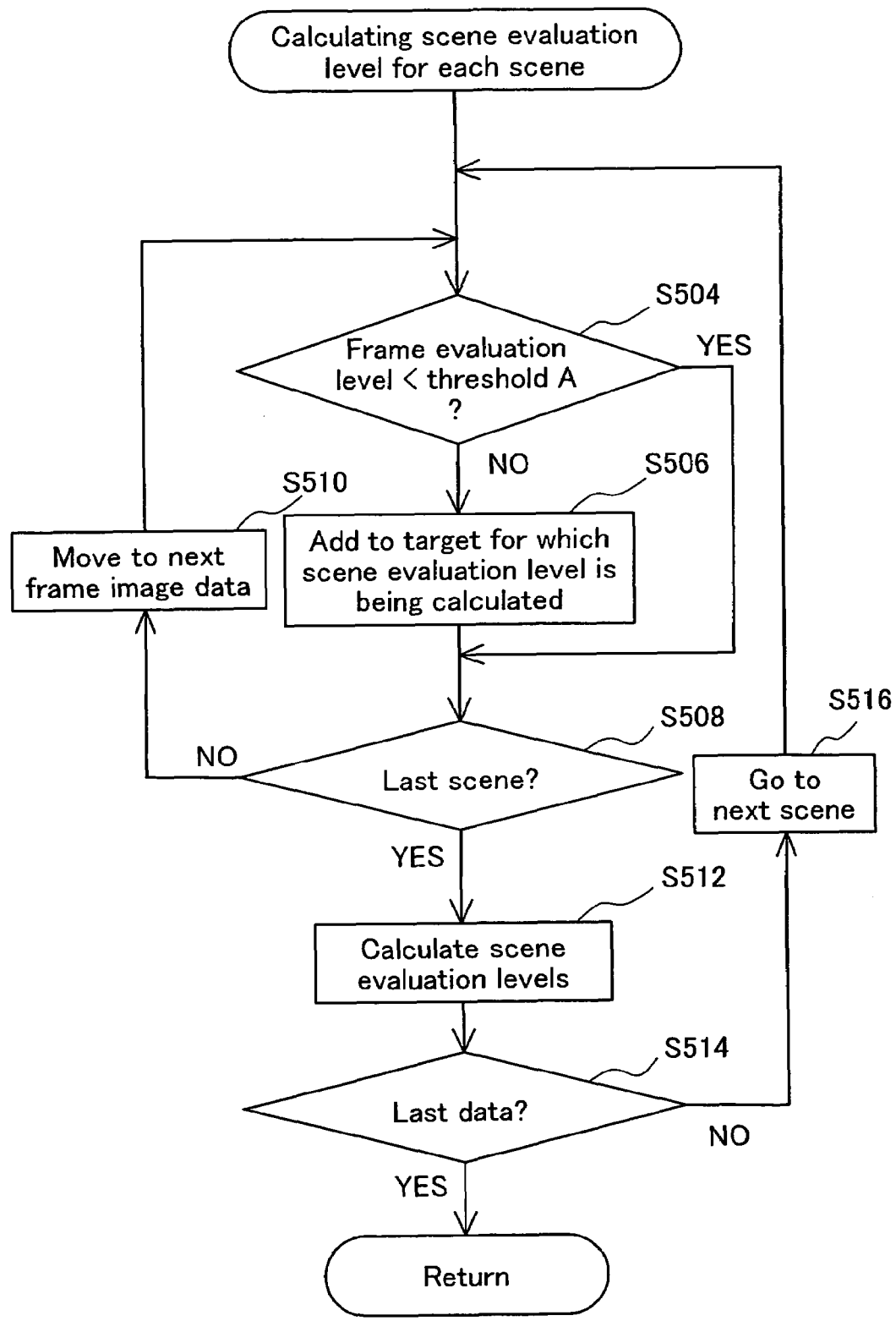
FIG. 11 is a flow chart of the process for calculating the scene evaluation level of each scene.

FIG. 11 is a flow chart of the process for calculating the scene evaluation level of each scene. In the process for calculating the scene evaluation levels, it is first determined whether or not the frame evaluation level of the first frame image data of the first scene in the video data is lower than Threshold A (Step S504). When the frame evaluation level is greater than Threshold A (Step S504: NO), the frame evaluation level is added to the target for which the scene evaluation level is being calculated (Step S506). When the frame evaluation level is lower than Threshold A (Step S504: YES), the frame evaluation level is not added to the target for which the scene evaluation level is being calculated. This corresponds to the establishment of Threshold A and the selection of frame images for which the scene evaluation level is being calculated in FIG. 5.

When the process is not complete to the final frame image data of the scene (Step S508: NO), the process moves to the next frame image data in the scene (Step S510), and Steps S504 through S508 are repeated. When the process is completed to the final frame image data of the scene (Step S508: YES), the scene evaluation levels of the scene are totaled (Step S512). In other words, the average of the frame evaluation levels added to the target for which the scene evaluation levels are being calculated in Step S506 is calculated as the scene evaluation level.

When the process is not completed to the final data (Step S514: NO), the process moves to the next scene in the video data (Step S516), and Steps S504 through S512 are repeated. When the process is completed to the final data (Step S514: YES), the scene evaluation levels of all the scenes are obtained, and the next process is thus started.

The description will be resumed with reference to FIG. 10. It is then determined whether or not the scene evaluation level of the first scene in the video data is lower than Threshold B (Step S518). When the scene evaluation level is lower than Threshold B (Step S518: YES), the scene playback time of the scene is set 0 (Step S520). When the scene evaluation level is greater than Threshold B (Step S522), the scene evaluation level is added to the total evaluation level (Step S522). This corresponds to the establishment of the Threshold B and the selection of the target for which the scene playback time is calculated in FIG. 6. The initial total evaluation level is 0.

When the process is not complete to the final data (Step S524: NO), the process moves to the next scene in the video data (Step S526), and Steps S518 through S524 are repeated. When the process is completed to the final data (Step S524: YES), the total evaluation level is determined, and the scene playback time of each scene is calculated (Step S528). The formula, as noted above, is as follows:

(Scene playback time)=(Scene evaluation level)/(Total evaluation level of all scenes)×(Desired total playback time).

The description will continue again with reference to FIG. 8. When the scene playback time of each scene has been calculated (Step S500), the frame group extraction process is then carried out (Step S600).

Figure 12:
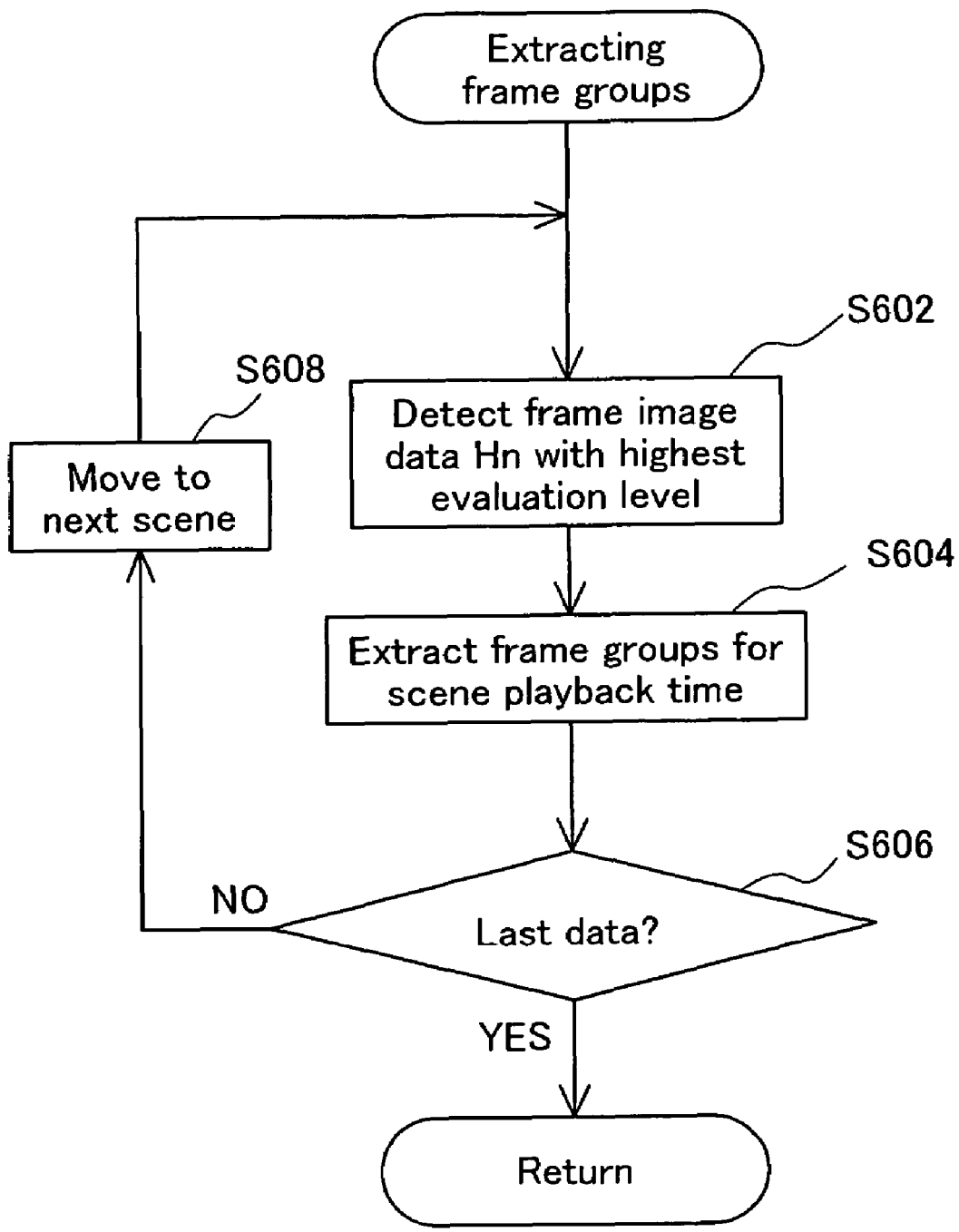
FIG. 12 is a flow chart of the frame group extraction process.

FIG. 12 is a flow chart of the frame group extraction process. The process starts from the first scene in the video data which is targeted for frame group extraction, that is, which has a scene playback time greater than 0. The frame image data Hn with the highest frame evaluation level in the scene is first detected (Step S604). Here, n represents the number at the end of the scene name.

A frame group corresponding to the scene playback time is extracted from the scene (Step S604). The method for extracting frame groups has been described with reference to FIG. 7. When the process has not been completed to the last data (Step S606: NO), the process moves to the next scene in the video data (Step S608), and Steps S602 through S606 are repeated. When the process is completed to the last data (Step S606: YES), the next process is begun.

The description will continue again with reference to FIG. 8. When one frame group has been extracted from each scene, the digest video data is then produced (Step S700). The digest video data is produced by joining the extracted frame groups. The digest video data that has been produced is then output (Step S800). The output destination may be a digital video camera 30 or CD-R/RW drive 140. The user can view the digest video when the output digest video data is played back on the digital video camera 30.

The video processing device 100 in the above embodiment allows the playback time of scenes in digest video to be varied for each scene, allowing digest video data including several scenes to be readily produced according to the desired playback time. In this embodiment, the scene playback time is zero in relatively unimportant scenes with a scene evaluation level under a certain level, and these scenes are not used in the digest video data, allowing the scene playback time of other relatively important scenes to be prolonged. Frame groups including the best frame image in each scene can also be extracted to readily extract frame groups which are believed to correspond to shots of particularly high importance in a scene.

B. Second Embodiment

B1. Frame Group Extraction

The second embodiment is related to the extraction of frame groups. In this embodiment as well, the frame extracting module 115 extracts a number of frame images corresponding to the scene playback time calculated by the playback-time computing module 111 (referred to below simply as the necessary frame number).

Figure 13:
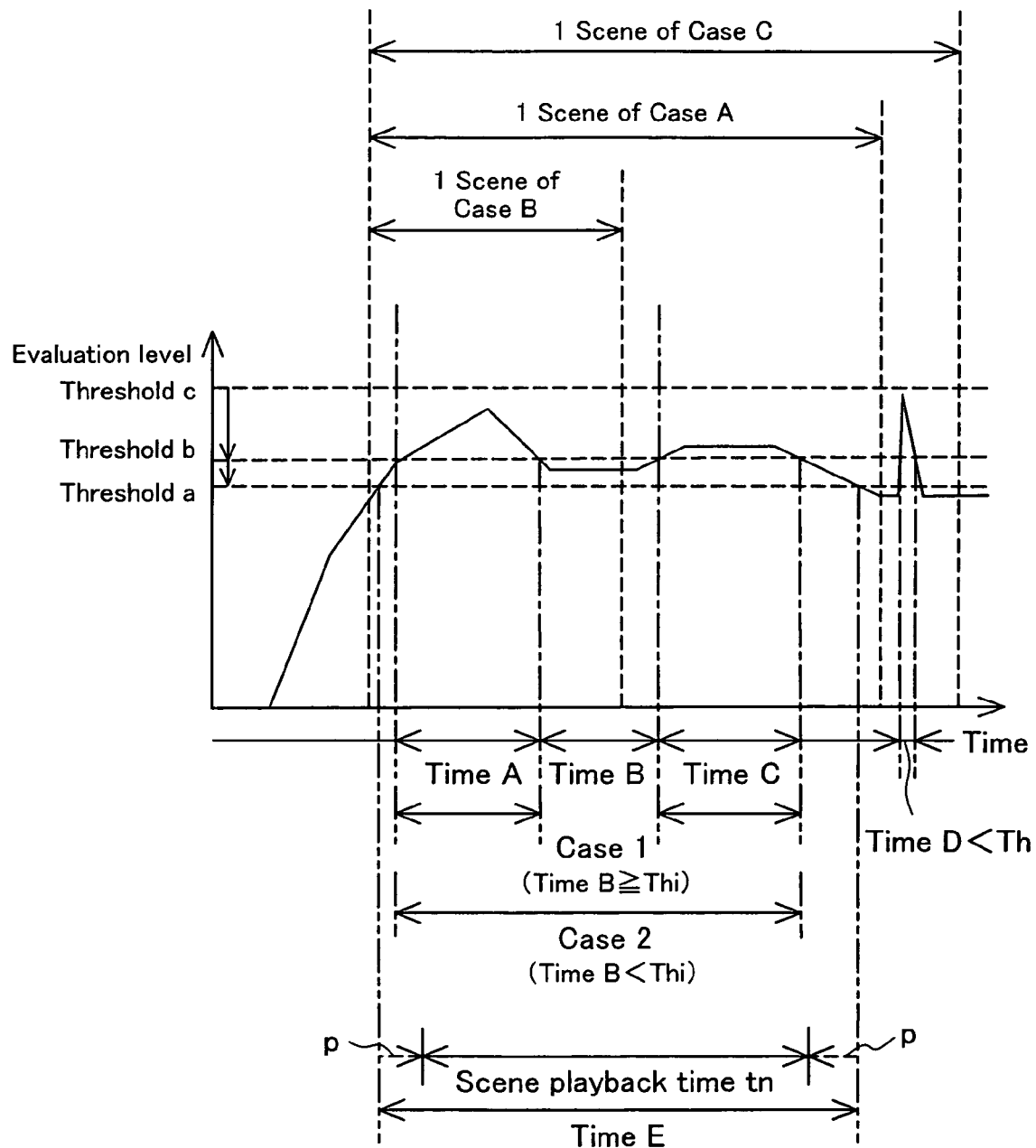
FIG. 13 illustrates evaluation levels of frame image data.

FIG. 13 illustrates temporal change of the frame evaluation level. The scene playback time tn is a value calculated by the playback-time computing module 111 in the manner described before. There are shown three exemplary single scenes of different scene lengths for cases A, B, and C; the scene in case C is the longest, and the scene in case B is the shortest.

In the second embodiment, the frame extracting module 115 extracts a frame group with frame images having a frame evaluation level exceeding a threshold level in order to extract a frame group of particularly high importance. However, the frame extracting module 115 adjusts the threshold to extract the necessary number of frame images. When, for example, a threshold C is used, since no frame groups will be extracted from 1 scene in either Case A or Case B, the threshold is adjusted (from threshold C to threshold A or B in FIG. 13) to extract the necessary number of frame images.

When the frame extracting module 115 used threshold B, a frame group corresponding to Time A (Frame Group A), a frame group corresponding to Time C (Frame Group C), and a frame group corresponding to Time D (Frame Group D) are extracted from 1 scene in Case C.

This embodiment uses a condition for extracting a frame group that each frame group is composed of a number of frame images greater than a certain number Th in order to produce digest video data permitting the user to perceive one shot. In this case, frame groups such as Frame Group D, which have a low number of frames and a short playback time, are not extracted.

In this embodiment, when the interval (Time B in FIG. 13) between the extracted Frame Group A and Frame Group C is narrow, the frame group corresponding to Time B (Frame Group B) is also extracted along with Frame Group A and Frame Group C (Case 2 in FIG. 13). This is to prevent the digest video from being split up too much. In this example, when Time B is less than 5 seconds, the time is considered to be short. When Time B is greater than a certain time Thi, Frame Group B is not extracted (Case 1 in FIG. 13). When, as in Case B, the frame groups to be extracted (total of Frame Groups A, B, and C) are not included in the 1 scene, Frame Group B is not extracted, even though the time range B is narrow. That is because, since the scene is cut, there is no need to continue the frame image for playback.

It is assumed below that the 1 scene is that of Case A and the frame groups to be extracted are those of Case 1 where Time B is greater than a certain level Thi. The frame extracting module 115 extracts frame groups again by adjusting the threshold because Times A and C combined are less than the scene playback time tn. Specifically, the threshold B is changed to the threshold A to re-extract frame groups.

When the frame extracting module 115 uses threshold A, the frame group corresponding to Time E (Frame Group E) is extracted. Because the Time E is longer than the scene playback time tn, the frame extracting module 115 finishes adjusting the threshold, and adjusts the frame number of Frame Group E. Specifically, until the Time E is consistent with the scene playback time tn, in other words, until the frame number of Frame Group E is the necessary frame number, frame image data is alternately removed one at a time from the rear and front ends of Frame Group E. In FIG. 13, this process is represented by arrow p. The first one removed may be frame image data from the front or rear. The frame image data can also be removed from either just the front or the rear end rather than alternately. The evaluation level of the frame image data in the front end of Frame Group E may also be compared with the frame evaluation level of the frame image from the rear to eliminate frame images of lower evaluation levels.

B2. Process Flow

Figure 14:
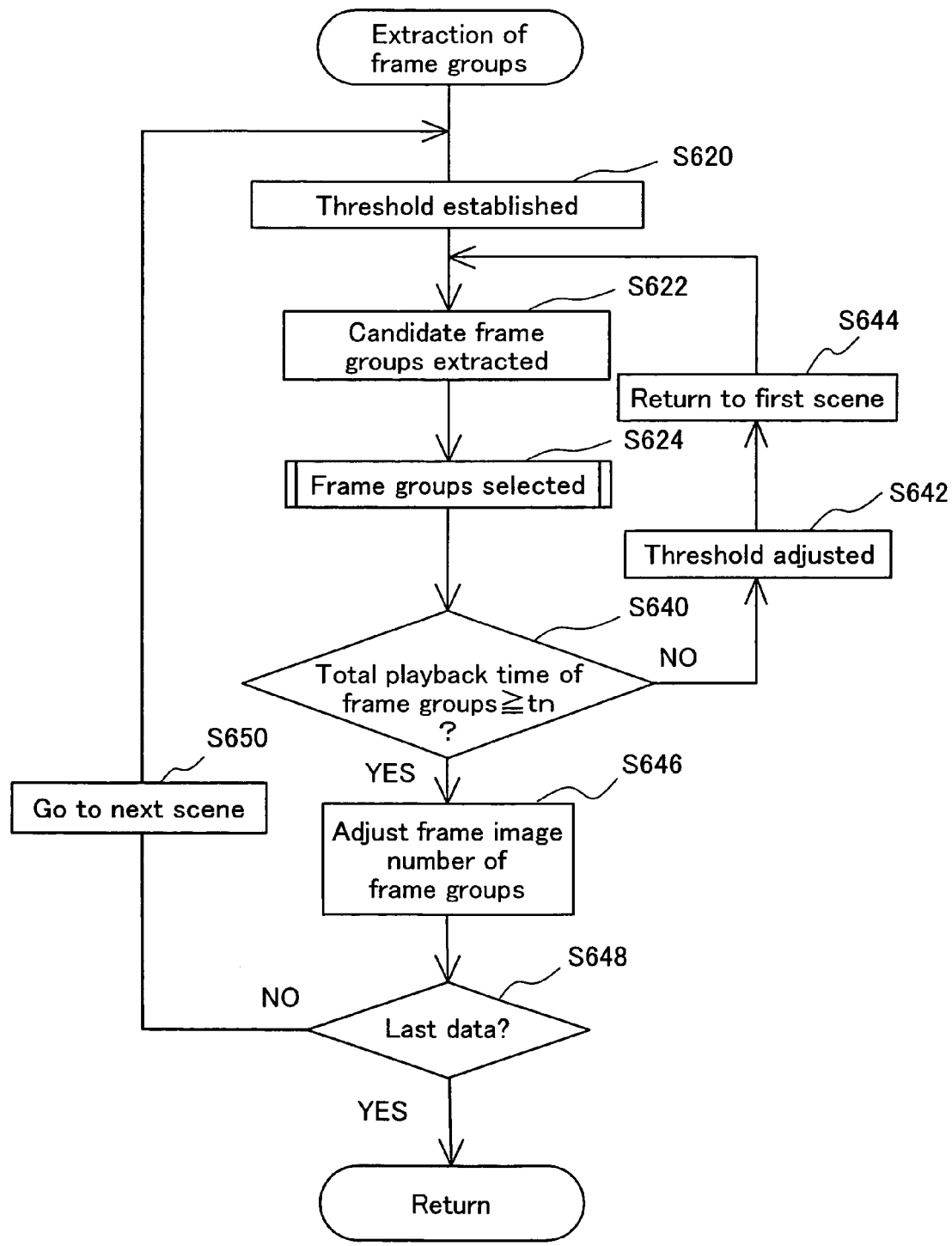
FIG. 14 is a flow chart of the process for extracting frame groups in the second embodiment.

FIG. 14 is a flow chart of the process for extracting frame groups in the second embodiment. The video processing device 100 first established a threshold (Step S620). The threshold is a sufficiently high predetermined level. The frame evaluation levels of frame images in the first scene that does not have a scene playback time of 0 is then retrieved, and all the frame groups which are candidates for inclusion in the digest video data are extracted (Step S622). Specifically, frames whose frame evaluation levels are over the threshold are extracted.

Figure 15:
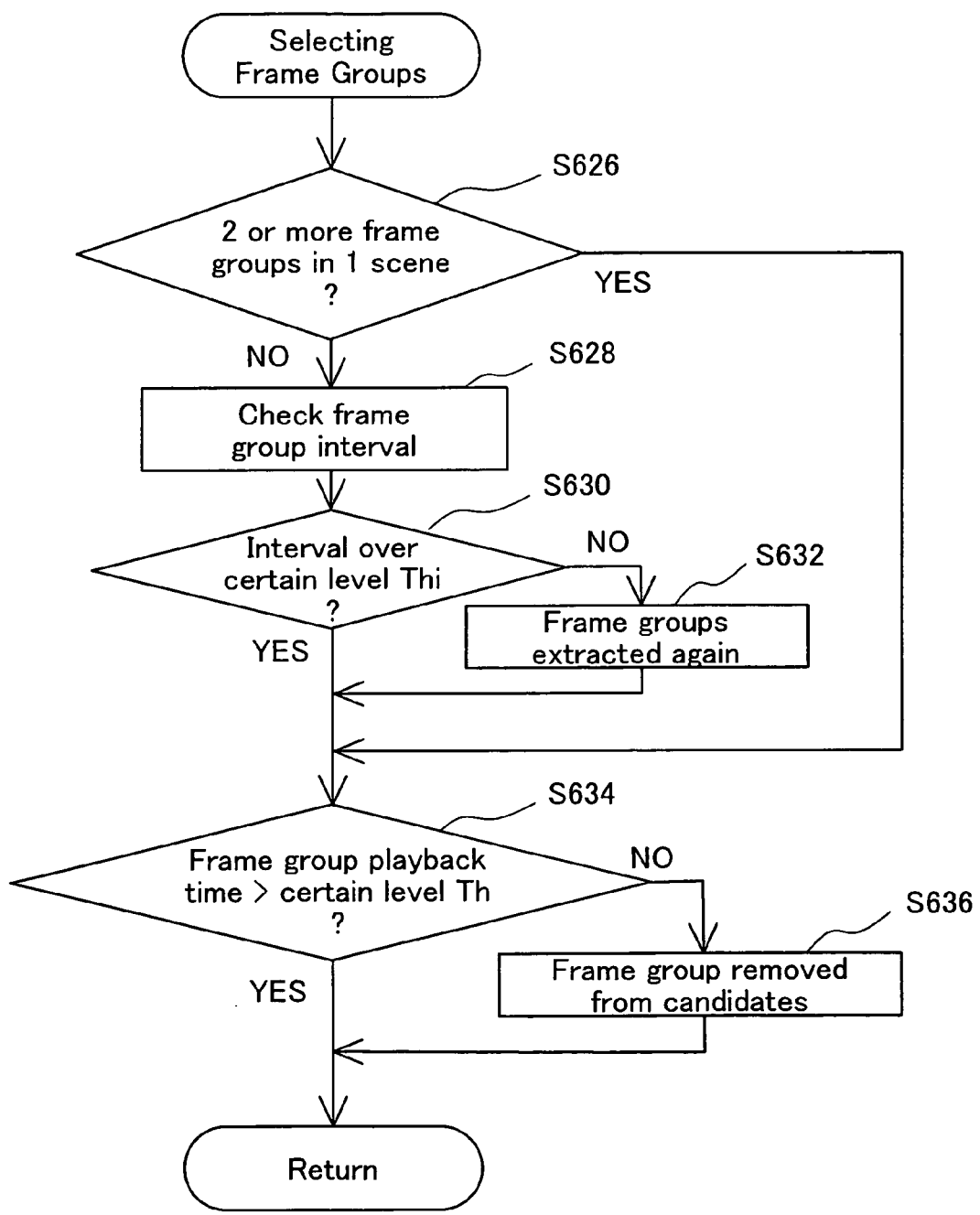
FIG. 15 is a flow chart of the process for selecting frame groups.

Some of the extracted frame groups are then selected (Step S624). FIG. 15 is a flow chart of the process for selecting frame groups. In the process for selecting frame groups, when 2 or more frame groups have been extracted in Step S622 (Step S626: YES), the interval of any two frame groups is checked (Step S628). The interval referred to here is the number of frame images between the two frame groups, corresponding to Time B in the example in FIG. 13.

When the interval is smaller than a certain value Thi (Step S630: NO), frame groups are extracted again (Step S632). When frame groups are again extracted, the two frame groups in which the interval is smaller than the certain value and the frame image data between them are extracted as one frame group. In the example in FIG. 13, the number of frames in Frame Group B is smaller than the certain value Thi (Case 2 in FIG. 13), this corresponds to the extraction of the frame group corresponding to Time B along with Frame Groups A and C. When all the intervals in the frame groups extracted in Step S622 have been checked, the process moves to the next step. When the frame groups extracted in Step S622 are 1 or less (Step S626: NO), Steps S628 through S632 are omitted.

The video processing device 100 then determines whether or not the playback time of the extracted frame groups is greater than the certain minimum value Th (Step S634). When the frame image data number is under the certain minimum value Th (Step S634: NO), the frame group is removed from the candidates for the digest video data (Step S636). In the example in FIG. 13, this corresponds to Frame Group D. When the playback time of the frame groups is greater than the certain minimum value Th (Step S634: YES), the process proceeds to the next step, including the frame group in the candidates.

The description will be resumed with reference to FIG. 14. The video processing device 100 then checks whether or not the total of the playback time in the remaining candidate frame groups is over the scene playback time tn of the scene (Step S640). Specifically, it checks whether or not the total number of frame images in the remaining candidate frame groups is at or over the necessary frame number.

When the total of the playback time in the frame groups is shorter than the scene playback time tn (Step S640: NO), the threshold is adjusted (Step S642), and the process again returns to the first scene (Step S644). The process is repeated from Step S622 and after. The adjustment of the threshold corresponds to the change of the threshold from Threshold B to Threshold A in FIG. 13. The threshold may be adjusted by being reduced at a constant step.

When the total of the playback time in the frame groups is at or over the scene playback time tn (Step S640: YES), the frame number of the frame groups is adjusted until the total of the playback time in the frame groups is consistent with the scene playback time tn (Step S646). In FIG. 13, this corresponds to reducing the frame number of Frame Group E and shortening Time E to the scene playback time tn. In Step S640, when the playback time in the frame groups is consistent with the scene playback time tn, Step S646 can be omitted.

If the process has not been completed to the final video data (Step S648: NO), the process moves to the next scene (Step S650), and the process from Step S620 on is repeated on that scene.

The video processing device 100 in the second embodiment above makes it possible to extract only the necessary number of the frame images suitable for digest video data, which are regarded as being of high importance.

C. Variants

The present invention is not limited to the above examples, and can assume a variety of structures without departing from the spirit of the invention. For example, in order to extract frame groups from all the scenes, the scene playback times of scenes in which the scene evaluation level is below a certain level may still be determined in order to extract the necessary frame number. This will allow digest video data including all scenes to be produced.

When 1 scene length is under the certain threshold Th shown in the second embodiment, the scene playback time of the scene may be 0, without calculating the scene time. In other words, scenes that are too short may be left out of the condensed vide data.

In the above embodiments, the desired playback time of the digest video is instructed by the user, but a proportion shortening the video may be instructed by the user instead.

In the second embodiment, the frame extracting module 115 may extract a frame group in which the frame evaluation level increases or stays constant. In Step S640, when the total of the playback time of the frame groups is smaller than the scene playback time tn, frame image data that is continuous in a time series in the extracted frame group may be extracted along with the frame group, so as to extract the necessary number of frame images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for producing digest video data of a desired playback time from original video data including a plurality of frame images that are continuous in a time series, comprising:
   a scene splitting module configured to split the original video data into a plurality of scenes each including a plurality of frame images;
   a frame evaluation level calculating module configured to calculate a frame evaluation level representing an importance of each frame image;
   a scene evaluation level calculating module configured to calculate a scene evaluation level representing an importance of each scene from the frame evaluation levels of the frame images included in the scene;
   a playback time computing module configured to determine a scene playback time of each scene in the digest video data, based on the desired playback time and the scene evaluation level;
   a frame extracting module configured to extract frame images to be used in the digest video data from each scene, based on the scene playback time; and
   a digest production module configured to produce the digest video data from the extracted frame images.

* * * * *